United States Patent
Ihms et al.

(10) Patent No.: US 8,696,804 B2
(45) Date of Patent: Apr. 15, 2014

(54) CARBON DIOXIDE ABSORBENT FLUID FOR A CARBON DIOXIDE SEQUESTERING SYSTEM ON A VEHICLE

(71) Applicant: Delphi Technologies, Inc., Troy, MI (US)

(72) Inventors: David W. Ihms, Russiaville, IN (US); Bruce A. Myers, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/861,843

(22) Filed: Apr. 12, 2013

(65) Prior Publication Data

US 2013/0220130 A1     Aug. 29, 2013

Related U.S. Application Data

(63) Continuation-in-part of application No. 12/980,528, filed on Dec. 29, 2010, now Pat. No. 8,480,798.

(51) Int. Cl.
    *B01D 47/00*     (2006.01)

(52) U.S. Cl.
    USPC .................................. 96/234; 96/243; 95/183

(58) Field of Classification Search
    None
    See application file for complete search history.

(56) References Cited

U.S. PATENT DOCUMENTS

| 3,691,140 | A | 9/1972 | Silver |
| 5,857,324 | A | 1/1999 | Scappatura et al. |
| 6,364,938 | B1 * | 4/2002 | Birbara et al. ................ 95/139 |
| 6,387,337 | B1 | 5/2002 | Pennline et al. |
| 6,475,460 | B1 | 11/2002 | Max |
| 6,547,854 | B1 | 4/2003 | Gray et al. |
| 6,733,667 | B2 | 5/2004 | Max |
| 6,755,892 | B2 | 6/2004 | Nalette et al. |
| 7,056,482 | B2 | 6/2006 | Hakka et al. |
| 7,067,456 | B2 | 6/2006 | Fan et al. |
| 2006/0144235 | A1 * | 7/2006 | Clarke et al. ..................... 96/5 |
| 2008/0031801 | A1 | 2/2008 | Lackner et al. |
| 2008/0044335 | A1 | 2/2008 | Anttila et al. |
| 2010/0051859 | A1 | 3/2010 | House et al. |
| 2010/0062926 | A1 * | 3/2010 | Woodhouse et al. ........... 502/55 |
| 2010/0284866 | A1 | 11/2010 | Jang et al. |

(Continued)

FOREIGN PATENT DOCUMENTS

| EP | 1857169 | 12/2007 |
| WO | WO 0166919 A1 * | 9/2001 |
| WO | 2009084887 | 7/2009 |

OTHER PUBLICATIONS

WO 0166919A1.*

(Continued)

*Primary Examiner* — Robert Clemente
*Assistant Examiner* — Phillip Shao
(74) *Attorney, Agent, or Firm* — Lawrence D. Hazelton

(57) ABSTRACT

A carbon dioxide storage means stores the carbon dioxide released in a heat exchanger. The heat exchanger cools the exhaust gas emitted by the internal combustion engine, and includes a thermal electric generator (TEG) configured to couple thermally the exhaust gas chamber to the absorber fluid chamber in a manner effective to heat the CO2 absorbent fluid by heat from the engine exhaust to release CO2 gas from the CO2 absorbent fluid and generate electricity in response to a temperature difference therebetween. The CO2 absorbent fluid is one of: a) an aliphatic di-functional nitrile (e.g. pimelonitrile); and b) an oligomeric poly-acrylonitrile (PAN).

2 Claims, 3 Drawing Sheets

(56) References Cited

U.S. PATENT DOCUMENTS

2012/0118162 A1      5/2012   Ogawa et al.
2012/0134905 A1*     5/2012   Kalb .......................... 423/220
2012/0171105 A1      7/2012   Cooper et al.
2012/0227440 A1      9/2012   Guidati et al.
2012/0263627 A1     10/2012   Fujita et al.
2013/0004406 A1      1/2013   Chung et al.

OTHER PUBLICATIONS

Lackner, Klaus S.: "Washing Carbon Out of the Air", Scientific American, Jun. 2010, pp. 66-71.

U.S. Appl. No. 12/980,528, filed Dec. 29, 2010, entitled "Vehicle System to Separate and Store Carbon Dioxide From Engine Exhaust".

* cited by examiner

CARBON DIOXIDE ABSORBENT FLUID FOR A CARBON DIOXIDE SEQUESTERING SYSTEM ON A VEHICLE

CROSS-REFERENCE TO RELATED APPLICATION

This application is a continuation-in-part application and claims the benefit under 35 U.S.C.§120 of U.S. patent application Ser. No. 12/980,528, filed Dec. 29, 2010, the entire disclosure of which is hereby incorporated herein by reference.

TECHNICAL FIELD OF INVENTION

The invention generally relates to a system using a carbon dioxide absorbent fluid for separating or capturing carbon dioxide gas from internal combustion engine exhaust and then storing that gas. More particularly, the invention relates to the chemical used as the carbon dioxide absorbent fluid in the system.

BACKGROUND OF INVENTION

There is a continuing effort to increase the operating efficiency of vehicles, and reduce emissions. Internal combustion engine in vehicles generally emit carbon dioxide (CO2) as a by-product of an internal combustion process. Systems that extract CO2 from engine exhaust have been proposed. However, such systems often reduce operating efficiency of the vehicle on which they are installed.

SUMMARY OF THE INVENTION

In accordance with one embodiment of this invention, a system for sequestering carbon dioxide gas from exhaust gas emitted by an internal combustion engine. The system includes a scrubber tank containing a carbon dioxide absorbent fluid and configured to bubble the exhaust gas through the fluid. The fluid includes one of: a) an aliphatic di-functional nitrile; and b) an oligomeric poly-acrylonitrile (PAN).

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
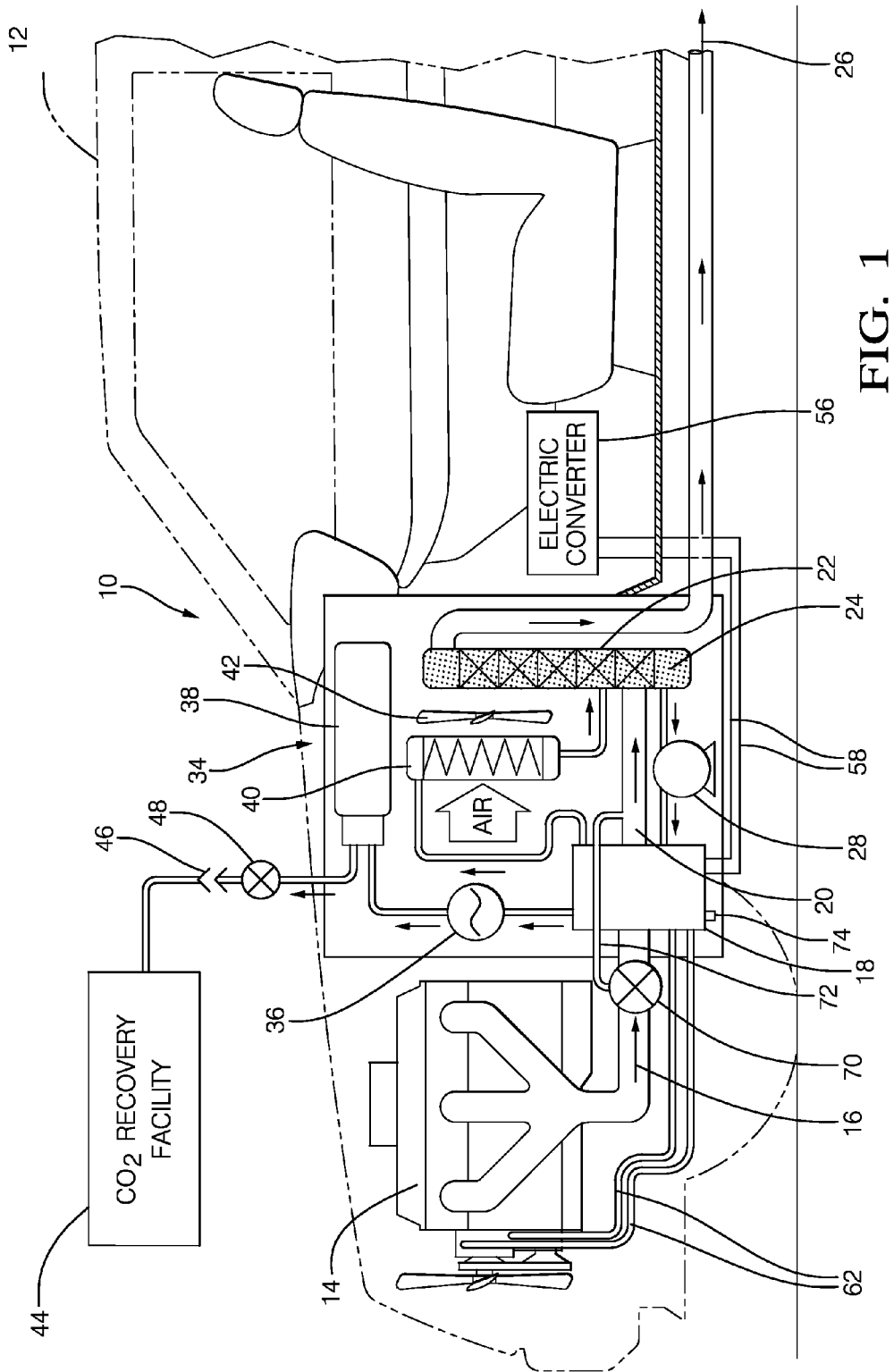
FIG. 1 is a diagram of a system for separating carbon dioxide gas from internal combustion engine exhaust in accordance with one embodiment.

FIG. 1 illustrates a non-limiting example of vehicle 12 equipped with an embodiment of a system 10 for separating carbon dioxide gas from exhaust gas 16 emitted by internal combustion engine 14. In this example, the internal combustion engine 14 that may be configured to propel the vehicle 12. However, stationary applications of engines are contemplated. Examples of suitable internal combustion engines include, but are not limited to, gasoline spark-ignition engines, compression ignition engines fueled with gasoline or diesel fuel, turbine engines, hybrid combustion/electric engines, and fuel cells such as solid oxide fuel cells. In general, the internal combustion engine 14 emits exhaust gas 16 when operating, and the exhaust gas 16 is generally characterized as having an elevated temperature. The exhaust gas may also include elevated levels of carbon dioxide. While not specifically shown, the exhaust gas will generally be downstream from known engine exhaust after treatment devices such as a catalytic converter.

The system 10 may include a heat exchanger 18 configured to cool the exhaust gas 16 emitted by the internal combustion engine 14, and so cooled exhaust gas 20 is generally passed out of the heat exchanger 18 to a scrubber tank 22. A more detailed explanation of the heat exchanger 18 is provided below with regard to FIG. 2. The heat exchanger 18 is preferably made of metal such as stainless steel, aluminum, or copper. The heat exchanger is preferably assembled using formed sheets of metal shaped and attached using manufacturing techniques that are well known to those in the heat exchanger arts.

The scrubber tank 22 is generally configured to contain a carbon dioxide absorbent fluid 24, hereafter often 'the fluid 24'. The scrubber tank 22 is also configured to bubble cooled exhaust gas 20 from the heat exchanger 18 through the carbon dioxide absorbent fluid 24, whereby carbon dioxide gas in the cooled exhaust gas 20 is absorbed by the fluid 24. Early testing indicated that Novec™ HFE7600 produced by 3M Company would be a suitable fluid. It is noted that 3M primarily markets this fluid as a heat transfer medium for use in electronics and other cooling applications. However, subsequent testing has indicated that other families of chemicals may be better suited for automotive applications where the exhaust gas 20 is emitted by an internal combustion engine propelling a vehicle.

Subsequent testing has identified other suitable chemical families for use as the fluid 24 which include one of: a) an aliphatic di-functional nitrile (e.g. pimelonitrile and b) an oligomeric poly-acrylonitrile (PAN). While other chemicals are available that have the ability to absorb carbon dioxide, they typically exhibit some property that makes them undesirable for use m an automotive environment.

Preferably, the aliphatic di-functional nitrile has a molecular weight of 100 grams per mole (g/mole) to 180 g/mole. If the molecular weight of the aliphatic di-functional nitrile is less than 100 g/mole, the vapor pressure of the aliphatic di-functional nitrile may be too high to use for extracting carbon dioxide gas from the exhaust gas 20. If the molecular weight of the aliphatic di-functional nitrile is greater than 180 g/mole, the aliphatic di-functional nitrile may be a solid over a portion of the operating temperature range, and so would not be suitable for an automotive application.

Preferably, the oligomeric poly-acrylonitrile (PAN) has a molecular weight of 300 g/mole to 500 g/mole. It is anticipated that the free-radical initiator 2,2'-Azobisisobutyronitrile (AIBN) would be used in the synthesis oligomeric PAN materials having an appropriate molecular weight. A minimum of three acrylonitrile functional groups would be polymerized forming the first in a series of oligomeric PAN molecules. If the molecular weight is greater than 500 g/mole, high viscosity and a tendency to form an amorphous solid due to the associative interactions between the nitrite functional groups may make the chemical unsuitable for au automotive application.

Other chemicals were considered for use as the fluid 24, but were deemed to have performance characteristic that made them less than desirable. For example, a dioctylether compound was evaluated. The dioctylether meets ah but two of the criteria considered necessary to be a suitable chemical. Dioctylether was suitable because it had a relatively very low vapor pressure, a freezing temperature below −40 C., no smell low viscosity, fast CO2 absorption, low GWP, insoluble in water, and was considered to be chemically stable. However, although dioctylether quickly absorbs CO2, it only takes on an equal volume of the gas at room temperature. This is inadequate for the heat capacity of the material. A suitable chemical for the fluid 24 preferably has 3× or 4× volume absorption of dioctylether.

There are a number of other aliphatic mono- and di-functional group compounds (alcohols, ethers, ketones, etc.) that intrinsically provide desirable physical and chemical properties for the sequestering system set forth herein. However, in general, these compounds do not readily absorb adequate amounts of carbon dioxide gas. The compound dioctylether is a very good example of a such a compound that exhibits very desirable physical properties for application with sequestering system, except the ability to readily absorb useful levels of carbon dioxide gas.

Several known gas scrubber configurations would be suitable for use as or within the scrubber tank 22 to bring the fluid 24 into intimate contact with the cooled exhaust gas 20 to maximize the amount of CO2 removed from the cooled exhaust gas 20. After the cooled exhaust gas passes through the scrubber tank 22, scrubbed exhaust gas 26 is emitted by the system 10.

The system 10 may also include a pump 28 configured to urge the fluid 24 through the heat exchanger 18, wherein the fluid 24 is heated as heat is transferred from the exhaust gas 16 to form cooled exhaust gas 20. The pump 28 is illustrated as being located between the heat exchanger 18 and the scrubber tank 22, but it could be located elsewhere in the circulation path of the fluid 24. As such the location of the pump 28 illustrated is a non-limiting example.

Figure 2:
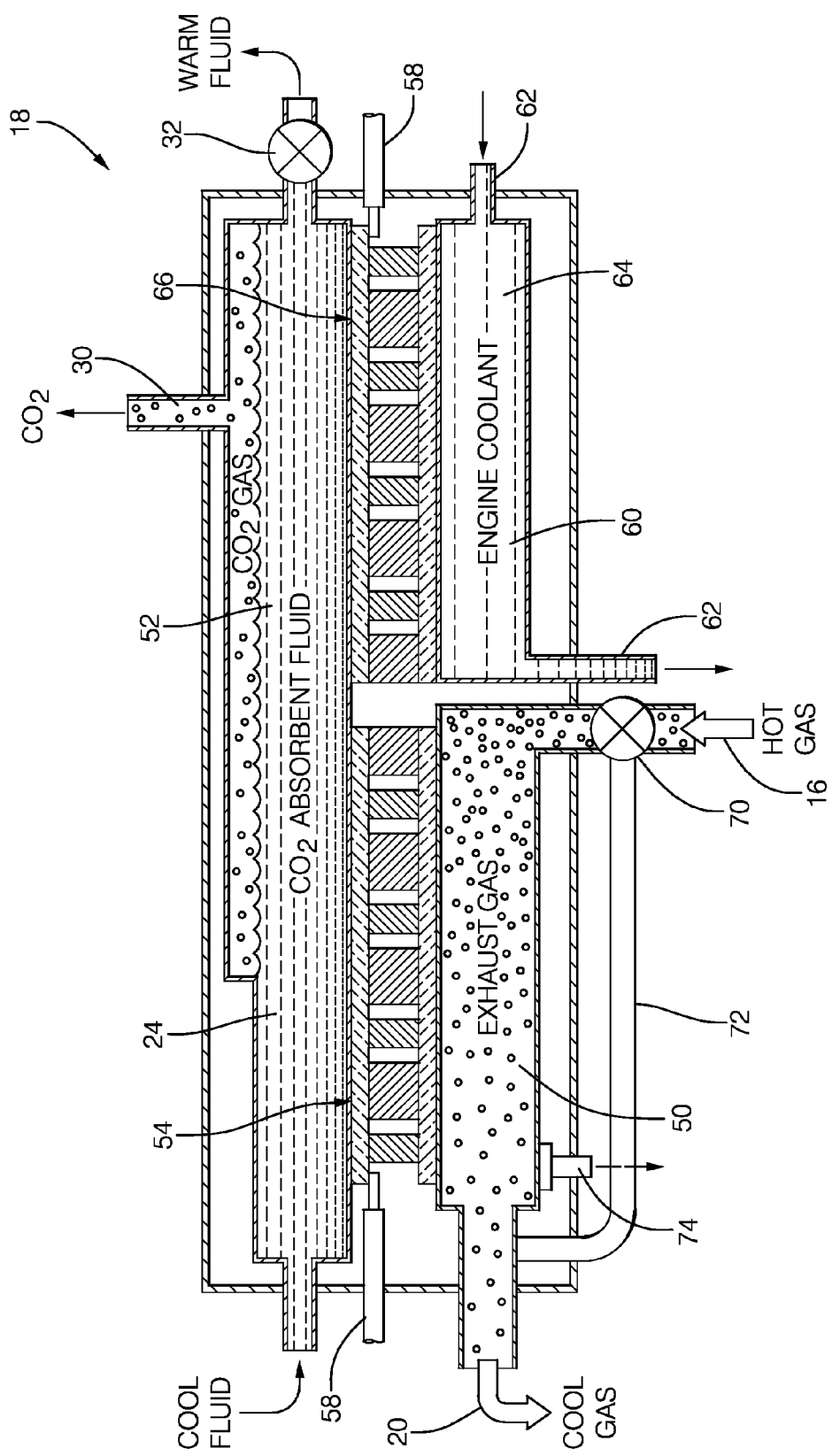
FIG. 2 is a diagram of a heat exchanger in the system of FIG. 1 in accordance with one embodiment.

FIG. 2 illustrates a non-limiting example of the heat exchanger 18. While not subscribing to any particular theory, but applying thermodynamic principles of heat conduction to the heat exchanger 18; as the exhaust gas 16 passes through the heat exchanger 18, heat is drawn from the exhaust gas 16 so cooled exhaust gas 20 exits the heat exchanger 18. Heat is drawn out of the exhaust gas 16 and transferred to the fluid 24, whereby the carbon dioxide absorbent fluid 24 releases the carbon dioxide (CO2) gas that was absorbed when the fluid was in the scrubber tank 22. The arrangement of the system 10 includes an inherent energy-efficiency in that the system 10 uses heat in the exhaust gas 16 for heating the fluid 24 to release the CO2, and so does not need to provide a separate heat source to release the CO2 from the fluid 24.

As suggested by FIG. 2, the CO2 generally rises out of the fluid 24 to the top of the heat exchanger 18 and accumulates around a CO2 gas outlet 30. In one embodiment, the heat exchanger 18 may include a thermostat 32 to help regulate the temperature of the fluid 24 exiting the heat exchanger 18 so that the amount of CO2 removed from the fluid 24 is maximized. It is noted that the heat exchanger 18 is generally configured to keep the exhaust gas 16 and the cooled exhaust gas 20 separated from the fluid 24, but does facilitate heat transfer from the exhaust gas 16 to the fluid 24.

Referring again to FIG. 1, the system 10 may also include a carbon dioxide storage means 34 configured to store the carbon dioxide released by the fluid 24 in the heat exchanger 18. As suggested by FIG. 1, one embodiment of the CO2 storage means 34 may include a compressor 36 and a storage tank 38. The compressor 36 and the storage tank 38 may be configured to store CO2 in liquid form. Also, the storage tank 38 is preferably sized so that the storage tank 38 does not need to be emptied any more frequently than the fuel tank (not shown) of the vehicle 12 needs to be filled with fuel.

The system 10 or the carbon dioxide storage means 34 may also include a carbon dioxide recovery facility 44, hereafter often facility 44. The facility is generally configured to empty the storage tank 38. The facility 44 may be part of a vehicle fueling station so that when the vehicle 12 is refueled, the storage tank 38 can be emptied. The storage tank 38 may be emptied by, for example, coupling the facility 44 to the storage tank 38 via a connection 46 and then operating a valve 48 so the contents of the storage tank 38 can be transferred to the facility 44. The facility 44 may be simply a larger storage tank that stores the contents from several vehicle storage tanks to await later transfer to a processing facility, or the facility 44 may be equipped to refine the contents received from the storage tank 38 and package carbon dioxide for storage at a permanent storage facility or for use by a consumer of carbon dioxide. The refinement process may also include recovering other chemicals or pollutants present in the storage tank 38, for example, but not limited to, carbon monoxide, nitric oxides, and unburned hydrocarbons.

The system 10 may also include a radiator 40 configured to receive fluid 24 from the heat exchanger 18 and cool the fluid 24 as it flows into the scrubber tank 22. The cooling by the radiator 40 may be assisted by a fan 42. It is desirable to cool the fluid 24 as much as possible since the fluid 24 generally is able to absorb more CO2 at lower temperatures, about 25 C for example, than at higher temperatures, 100 C for example. It should be appreciated that the heat exchanger (40) and fan (42) replace the engine radiator and fan typically found on vehicles without the system 10. This is possible because system 10 transfers the engine coolant heat into the CO2 absorbing liquid, thus eliminating the need for the conventional engine radiator and fan found on most vehicles.

It was recognized that overall system efficiency could be improved if the temperature difference between the exhaust gas 16 and the fluid 24 were further utilized. In particular, it was recognized that a thermal electric generator could be added to the heat exchanger 18 to form an electricity generating heat exchanger for a vehicle equipped with an exhaust gas carbon dioxide (CO2) separator. By way of further explanation and not limitation, the heat exchanger generally includes or defines an exhaust gas chamber 50 configured to guide the exhaust gas 16 through the heat exchanger 18, and an absorber fluid chamber 52 configured to guide CO2 absorbent fluid (i.e. the fluid 24) through the heat exchanger 18. The heat exchanger 18 also includes a first thermal electric generator (first TEG) 54 configured to couple thermally the exhaust gas chamber 50 to the absorber fluid chamber 52 in a manner effective to heat the fluid 24 by heat from the exhaust gas 16 to release CO2 gas from the fluid 24 and generate electricity in response to a temperature difference between the exhaust gas chamber 50 and the absorber fluid chamber 52.

Thermoelectric generator module technologies suitable for exhaust gas heat energy recovery have been developed by a number of companies including General Motors, Marlow Industries and Amerigon BSST. These generators typically use lead telluride or Skutterudite as the thermoelectric conversion material. Also suitable TEG modules based on a calcium magnesium oxide conversion material are commercially available from Thermal Electronics Corp.—CMO series. Thermoelectric generator modules suitable for engine coolant heat recovery typically use bismuth telluride thermoelectric conversion materials and are commercially available from a number of companies including Marlow Industries (TG12 series), and Hi-Z Technology (HZ series).

Continuing to refer to FIGS. 1 and 2, the system 10 may accordingly include a power convertor or electric converter 56 coupled to the heat exchanger by wires 58 and configured to convert electrical energy output by the first TEG 54 to a form suitable for use by, for example, the electrical system of the vehicle 12. The electric converter 56 may include a buck/boost converter to regulate the voltage or current output by the electric converter 56, as will be well understood by those in the electrical arts.

In another embodiment, the heat exchanger 18 may also include or define an engine coolant chamber 60 coupled to the internal combustion engine 14 by, for example, hoses 62 configured transport engine coolant 64 to and from the internal combustion engine 14. In general, the engine coolant chamber is configured to guide the engine coolant 64 through the heat exchanger 18. In some circumstances a temperature difference may be present between the engine coolant chamber 60 and the fluid 24, and so the heat exchanger may advantageously include a second TEG 66 configured to couple thermally the engine coolant chamber 60 to the absorber fluid chamber 52 in a manner effective to heat the CO2 absorbent fluid 24 by heat from the engine coolant 64 to further release CO2 gas from the CO2 absorbent fluid 24 and generate electricity in response to a temperature difference therebetween.

It is recognized that the temperature of the exhaust gas 16 may exceed the maximum temperature of some TEGs, and so the heat exchanger may advantageously include a bypass valve 70 operable to an open state and a closed state. When the bypass valve 70 is operated to the closed state, none of the exhaust gas 16 passes through a pipe 72 that bypasses the exhaust gas chamber 50, and so the temperature difference across the first TEG 54 is maximized. When the bypass valve 70 is operated to the open state, all or part of the exhaust gas 16 passes through the pipe to prevent overheating the first TEG 54.

It was discovered that fluid such as water may precipitate from the exhaust gas 16 into the exhaust gas chamber 50, and so the heat exchanger 18 may advantageously include a drain valve 74 operable to an open state and a closed state. When the drain valve is operated to the open state, fluid accumulated in the exhaust gas chamber 50 may be drained. Alternatively, the drain valve 74 may be replaced with a drain orifice (not specifically shown) having a fixed orifice size selected to drain fluid accumulated in the exhaust gas chamber. By way of example and not limitation, a suitable orifice size is a half-millimeter (0.5 mm). A drain orifice may be advantageous because it avoids the complexity and expense of an operable drain valve. However, if the potential of having fluid continuously drain from the system is undesirable, the drain valve 74 may be preferable.

Figure 3:
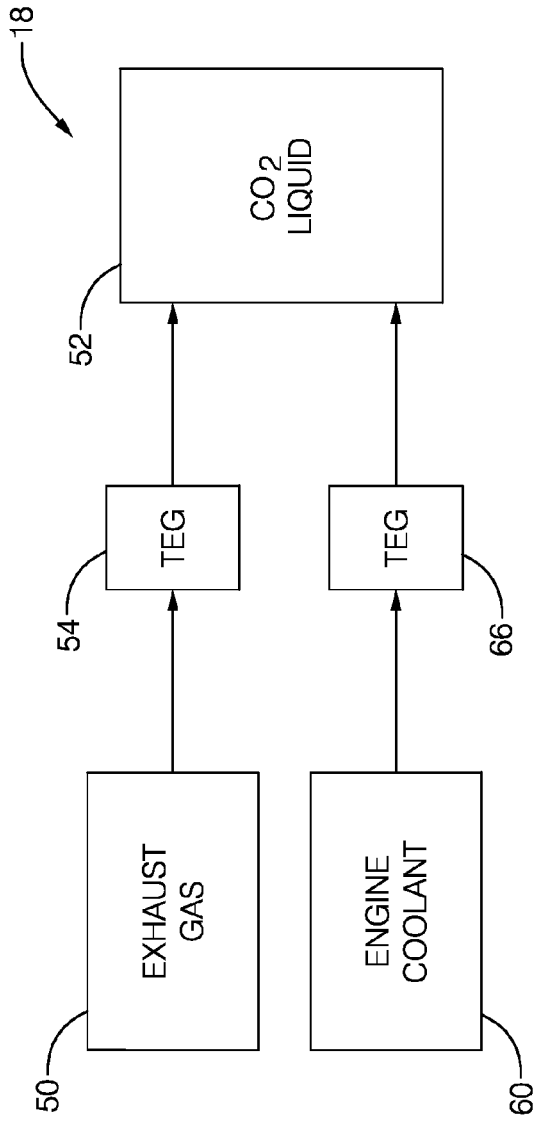
FIG. 3 is a diagram of a heat exchanger in the system of FIG. 1 in accordance with one embodiment and FIG. 4 is a diagram of a heat exchanger in the system of FIG. 1 in accordance with one embodiment.

FIG. 3 is a simplified version of FIG. 2 that illustrates how heat (shown as arrows) typically flows from one region of the heat exchanger to another. Preferably a TEG (54, 66) is in direct thermal contact to the chamber (50, 52, 60) to which the TEG is coupled thermally. As used herein, direct thermal contact means that the materials and assembly method used are selected to minimize heat transfer resistance between the chambers to which the TEG is coupled thermally. As such, for example, the first TEG 54 is preferably in direct thermal contact with the exhaust gas chamber 50 and the absorber fluid chamber 52 so that the amount of heat flowing through the first TEG 54 is maximized to maximize the amount of electricity generated by the first TEG 54. As describe above, a second embodiment of the heat exchanger may include a second TEG 66 in direct thermal contact with the absorber fluid chamber 52 and an engine coolant chamber 60.

Figure 4:
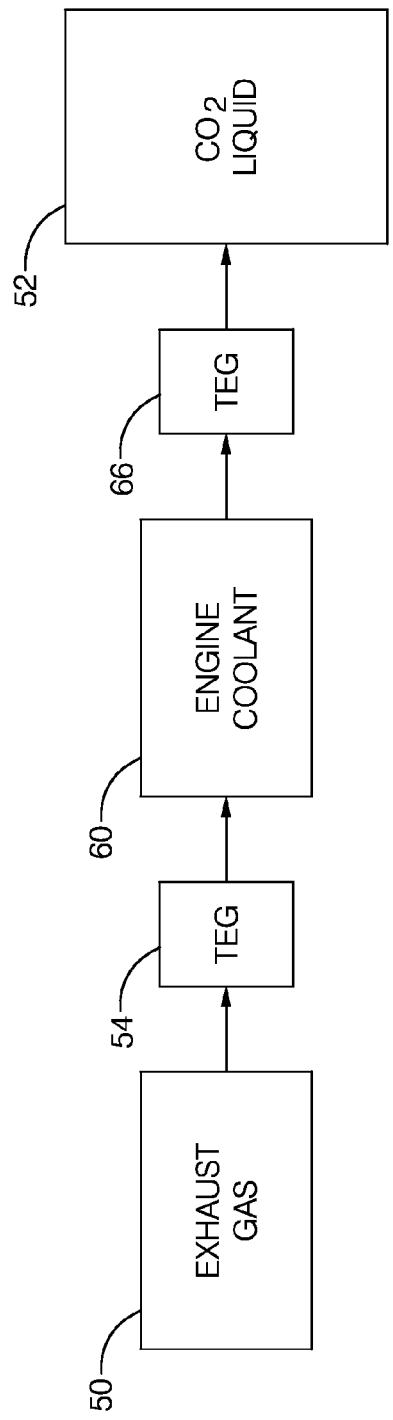

FIG. 4 illustrates an alternative configuration of a heat exchanger 18'. The configuration shown in FIG. 3 may be characterized as a parallel configuration, while the configuration shown in FIG. 4 may be characterized as a series or serial configuration. In this configuration, the heat exchanger 18' includes an engine coolant chamber 60 and a second TEG 66 interposed between the first TEG 54 and the absorber fluid chamber 52. In the serial configuration, the heat from the exhaust gas is transferred through the first TEG 54 into the engine coolant. This combines all of the heat already in the coolant from the engine 14 as well as the heat in the exhaust gas into the engine coolant. As such, all of the heat energy would flow through the second TEG 66 into the CO2 liquid. While not subscribing to any particular theory, this configuration under certain circumstances may generate more electrical energy than in the parallel configuration. A potential disadvantage the serial configuration is that there would be more thermal resistance in the heat exchange from the exhaust gas through the TEGs to the CO2 liquid. However, this can be compensated by improving the efficiency of the heat exchangers (more surface area) or by selecting a CO2 liquid with ether more CO2 absorption or with a lower specific heat.

Accordingly, a system 10 for separating and storing carbon dioxide (CO2) gas from exhaust produced by an internal combustion engine 14, and producing electric energy, is provided. The system 10 is particularly well suited for use on a vehicle because the vehicle regularly visits refueling stations where the storage tank 38 can be emptied, and the production of electric energy using waste heat from the combustion process improves overall efficiency of the internal combustion engine 14 or vehicle 12.

While this invention has been described in terms of the preferred embodiments thereof, it is not intended to be so limited, but rather only to the extent set forth in the claims that follow.

We claim:

1. A system for sequestering carbon dioxide gas from exhaust gas emitted by an internal combustion engine, said system comprising:
    a scrubber tank containing a carbon dioxide absorbent fluid and configured to bubble the exhaust gas emitted by the internal combustion engine through the fluid to absorb carbon dioxide gas from the exhaust gas; and
    a heat exchanger configured to heat the fluid with heat from the exhaust gas emitted by the internal combustion engine to release carbon dioxide gas from the fluid, wherein the fluid is returned to the scrubber tank after a portion of the carbon dioxide gas is removed from the fluid by the heat exchanger, wherein said fluid is essentially an oligomeric poly-acrylonitrile (PAN).

2. The system in accordance with claim 1, wherein the oligomeric poly-acrylonitrile (PAN) has a molecular weight of 300 g/mole to 500 g/mole.

* * * * *